United States Patent
Bergmark et al.

(10) Patent No.: US 12,267,677 B2
(45) Date of Patent: Apr. 1, 2025

(54) METHODS AND APPARATUSES FOR FACILITATING CONNECTION TO A WIFI NETWORK

(71) Applicant: Telia Company AB, Solna (SE)

(72) Inventors: Magnus Bergmark, Lidingö (SE); Michael Huber, Täby (SE)

(73) Assignee: Telia Company AB (SE)

( * ) Notice: Subject to any disclaimer, the term of this patent is extended or adjusted under 35 U.S.C. 154(b) by 211 days.

(21) Appl. No.: 17/840,244

(22) Filed: Jun. 14, 2022

(65) Prior Publication Data
US 2022/0408258 A1 Dec. 22, 2022

(30) Foreign Application Priority Data

Jun. 17, 2021 (SE) .................................... 2150783-5

(51) Int. Cl.
*H04W 76/10* (2018.01)
*H04W 12/069* (2021.01)
(Continued)

(52) U.S. Cl.
CPC ......... *H04W 12/069* (2021.01); *H04W 12/73* (2021.01); *H04W 76/10* (2018.02);
(Continued)

(58) Field of Classification Search
CPC ... H04W 12/069; H04W 12/73; H04W 84/12; H04W 88/08; H04W 76/10; G06K 19/06112; G06K 19/06037
See application file for complete search history.

(56) References Cited

U.S. PATENT DOCUMENTS

| | | | |
|---|---|---|---|
| 10,129,912 B2* | 11/2018 | Tinnakornsrisuphap | .................... H04L 41/0809 |
| 2011/0150266 A1* | 6/2011 | Hohndel | ................. G06F 21/31 382/100 |

(Continued)

FOREIGN PATENT DOCUMENTS

| | | | | |
|---|---|---|---|---|
| CN | 103220182 A | * | 7/2013 | ......... H04L 12/2834 |
| CN | 109089081 A | * | 12/2018 | ............. H04N 7/183 |

(Continued)

OTHER PUBLICATIONS

"Wi-Fi Easy Connect", obtained online from <https://web.archive.org/web/20180627034605/https://www.wi-fi.org/discover-wi-fi/wi-fi-easy-connect>, retrieved on Apr. 20, 2024 (Year: 2018).*

(Continued)

*Primary Examiner* — Zhimei Zhu
(74) *Attorney, Agent, or Firm* — Burr & Forman LLP (57) ABSTRACT

The embodiments herein relate to a network device, an access point and methods thereof for facilitating connection to a WiFi network. The method performed by the network device includes: detecting an access point provided with a service set identifier (SSID); connecting to said access point using said SSID; performing an authentication process towards an authentication and control server for verifying a unique certificate of the network device, which is paired with a corresponding certificate in said server; and in case the authentication process is successful, generating a unique identification information for enabling a user equipment to scan said unique identification information.

14 Claims, 7 Drawing Sheets

(51) Int. Cl.
*H04W 12/73* (2021.01)
*G06K 19/06* (2006.01)
*H04W 84/12* (2009.01)
*H04W 88/08* (2009.01)
*H04W 88/16* (2009.01)

(52) U.S. Cl.
CPC .. *G06K 19/06037* (2013.01); *G06K 19/06112* (2013.01); *H04W 84/12* (2013.01); *H04W 88/08* (2013.01); *H04W 88/16* (2013.01)

(56) References Cited

U.S. PATENT DOCUMENTS

| | | | |
|---|---|---|---|
| 2014/0282924 A1 | 9/2014 | Singhal | |
| 2017/0142086 A1 | 5/2017 | Chen et al. | |
| 2019/0356482 A1* | 11/2019 | Nix | H04W 12/041 |
| 2020/0106837 A1 | 4/2020 | Brickell et al. | |
| 2020/0221296 A1* | 7/2020 | Jiang | H04L 63/0869 |
| 2020/0403875 A1 | 12/2020 | Rooney et al. | |
| 2021/0014710 A1* | 1/2021 | Raju | H04W 4/38 |
| 2021/0266989 A1* | 8/2021 | Rooney | H04W 24/02 |
| 2022/0104017 A1* | 3/2022 | Konda | H04W 84/12 |
| 2022/0174473 A1* | 6/2022 | Rooney | H04L 9/50 |
| 2023/0308305 A1* | 9/2023 | Lee | H04L 12/2809 |

FOREIGN PATENT DOCUMENTS

| | | | | |
|---|---|---|---|---|
| CN | 111328076 A | 6/2020 | | |
| EP | 3065466 A1 | 9/2017 | | |
| WO | WO-2016202550 A1 * | 12/2016 | | H04L 63/18 |

OTHER PUBLICATIONS

Search Report, Apr. 20, 2021, Swedish Patent and Registration Office, Patent Application No. 2150783-5.

Exetended European Search Report, Nov. 14, 2022, European Patent Office, Application No. 22178381.4.

* cited by examiner

METHODS AND APPARATUSES FOR FACILITATING CONNECTION TO A WIFI NETWORK

TECHNICAL FIELD

The present disclosure relates to the field of wireless communications, and in particular to methods and apparatuses for facilitating connection to a WiFi network or to a WLAN.

BACKGROUND

With the advent of Internet access mobile communications technology, so also has evolved the presence of WiFi Internet access locations (i.e., hotspots provided by a network operator) where an Internet access mobile terminal may gain access to an Internet connection and Internet content. Such WiFi Internet access locations may comprise locations including but not limited to commercial services locations (i.e., restaurants, hotels, and other retail sales establishments), public services locations (i.e., airports, other transportation terminals, libraries, and government offices) and private locations (i.e., residences). These hotspots are also referred to as Open WiFi networks.

While ready mobile access to Internet service and Internet content is desirable within the context of the information technology art, ready mobile access to Internet service and Internet content is nonetheless not entirely without problems within the information technology art. In that regard, WiFi hotspots of an operator available to mobile terminals need to be managed by the operator in a way that is seamless to the mobile terminals especially when mobile terminals roam in a network comprising such WiFi hotspots. The greater the number of hotspots, the more difficult it is for an operator to manage such a network.

Also, connecting devices, e.g., network devices or user equipments (e.g., a printer with WiFi connectivity) to a WiFi network with limited input and/or limited screens may be troublesome for the users.

Thus, desirable are apparatuses, methods and program product that provide for seamless connectivity within the context of mobile connectivity to a WiFi network, in such a way as to facilitate for the operator control of the access to the network as well as to facilitate for the mobile terminal or user equipment to access to the network.

SUMMARY

It is an object of embodiments herein to solve the above problem by providing a network device, an access point, and methods thereof for facilitating connection to a WiFi network.

According to an aspect of embodiments herein, there is provided a method performed by a network device, the method comprising: detecting an access point provided with a service set identifier (SSID); connecting to said access point using said SSID; performing an authentication process towards an authentication and control server for verifying a unique certificate of the network device, which is paired with a corresponding certificate in said server; and in case the authentication process is successful, generating a unique identification information for enabling a user equipment to scan said unique identification information.

According to another aspect of embodiments herein, there is provided a method performed by an (WiFi) access point, the method comprising: connecting to a network device using an SSID, of the access point; enabling the network device to perform, via the access point, an authentication process towards an authentication and control server for verifying a unique certificate of the network device, which is paired with a corresponding certificate in said server; and in case the authentication process is successful, connecting to a user equipment, upon the user equipment scanning a unique identification information of the network device.

According to yet another aspect of embodiments herein, there is provided an network device comprising a processor and a memory containing instructions executable by said network device, wherein the network device is configured to: detect an access point provided with an SSID; connect to said access point using said SSID; perform an authentication process towards an authentication and control server for verifying a unique certificate of the device, which is paired with a corresponding certificate in said server; and in case the authentication process is successful, generate a unique identification information for enabling a user equipment to scan said unique identification information.

According to yet another aspect of embodiments herein, there is provided an access point comprising a processor and a memory containing instructions executable by said access point wherein the access point is configured to: connect to a network device using an SSID of the access point; enable the network device to perform, via the access point, an authentication process towards an authentication and control server for verifying a unique certificate of the network device, which is paired with a corresponding certificate in said server; and in case the authentication process is successful, connect to a user equipment, upon the user equipment scanning a unique identification information of the network device.

There is also provided a computer program comprising instructions which when executed on at least one processor of the network device according to embodiments herein, cause the at least one processor to carry out the method according to any one of pending claims 1-10. Also, a carrier signal containing the computer program of is provided, wherein the carrier signal is one of a computer readable storage medium; an electronic signal, optical signal, or a radio signal.

There is also provided a computer program comprising instructions which when executed on at least one processor of the access point according to embodiments herein, cause the at least one processor to carry out the method according to any one of pending claims 11-14. Also, a carrier signal containing the computer program of is provided, wherein the carrier signal is one of a computer readable storage medium; an electronic signal, optical signal, or a radio signal.

An advantage with embodiments herein is to facilitate connection to a WiFi network by means of the network device and the access point, respectively. This allows network devices to connect to the access point as soon as they are turned on. An identification information such as a QR (Quick Response) code or a barcode is generated on a screen of the network device for a user scan (by means of a user equipment such as a smart phone) to claim the network device and to access to the WiFi access network.

BRIEF DESCRIPTION OF THE DRAWINGS

Examples of embodiments herein are described in more detail with reference to attached drawings in which.

DETAILED DESCRIPTION

In the following, a detailed description of the exemplary embodiments is described in conjunction with the drawings, in several scenarios to enable easier understanding of the solution(s) described herein.

The Extensible Authentication Protocol (EAP) is a protocol for wireless networks that expands on authentication methods used by Point-to-Point Protocol (PPP), a protocol often used when connecting a computer or a network device to the Internet. EAP may support multiple authentication mechanisms, such as token cards, smart cards, certificates, one-time passwords, and public key encryption authentication. EAP also runs directly over data link layer such as IEEE 802 (WiFi).

This authentication type provides a high level of security in a wireless network. By using EAP to interact with an EAP-compatible RADIUS (Remote Authentication Dial-In User Service) server, an access point helps a wireless device or a network device or a user equipment (UE) and the RADIUS server to perform mutual authentication and derive e.g., a certificate or a key.

Figure 1:
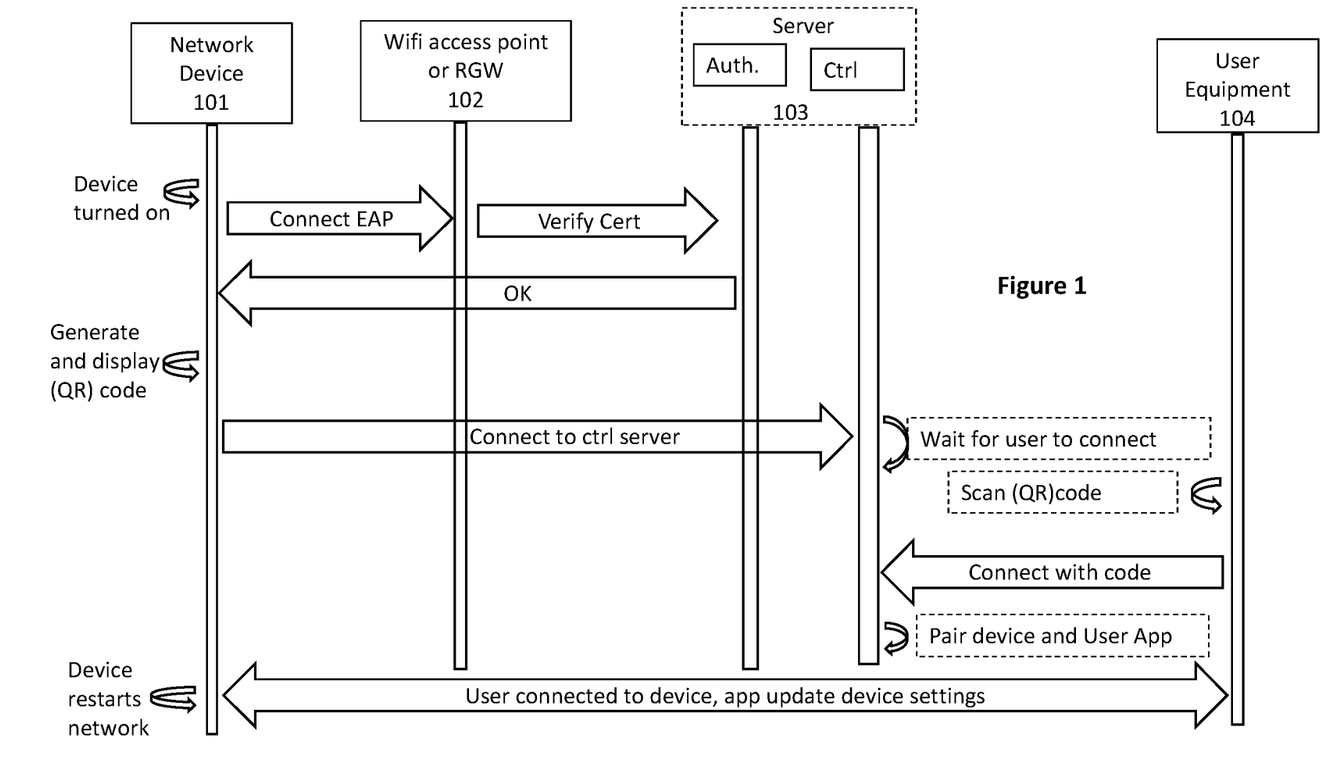
FIG. 1 is a simplified signalling diagram illustrating the principles of the method according to some exemplary embodiments herein.

Referring to FIG. 1 there is illustrated a simplified signalling diagram illustrating the principles of the method according to some exemplary embodiments herein. The figure shows a network device 101, which could be a printer with WiFi capabilities or a TV with WiFi capabilities or in general, a user equipment with WiFi capabilities. The figure also depicts an access point 102 which is a WiFi access point or a residential gateway (RGW), an authentication (Auth.) and control (Ctrl.) server 103 and a user equipment 104, such as a smart phone or in general a user's mobile terminal.

As shown, assume that the network device 101 is turned on. As mentioned above, the network device 101 is equipped with WiFi capability. When the network device 101 is on, it detects an access point 102 or a RGW. The access point 102 is already provided with an SSID and hence the network device 101 detects the SSID of the access point 101 and attempts to connects to it using the SSID. The network device 101 then performs an authentication process towards an authentication and control server 103 for verifying a unique certificate of the network device 101, which is paired with a corresponding certificate in said server 103. The unique certificate may be stored in the firmware/boot-up software of the device 101 and is then paired with a corresponding certificate in the server 103 in order for the WiFi connection to be granted. The hardware supplier of the network device 101 may register the device and their unique certificate to the system, through a back-office portal. Once the device is distributed and turned on, it pairs the stored unique certificate and is thereby granted WiFi access. So, in case the authentication process is successful, the network device 101 generates a unique identification information (such as a QR code or a barcode or the like) for enabling the user of the user equipment to scan the identification information. The identification information may be displayed on a screen (e.g., a small liquid crystal display (LCD) screen) of the network device 101 to be used for the user's application to connect to the device to upload credentials. Hence, the user equipment 104 may be provided with an application to enable it to connect the server 103. After the scanning of the identification information, the device and the user's app are paired by means of the server 103.

According to an embodiment, the SSID of the access point 102 may be a reserved SSID for enabling the network device 101 to connect to the access point 102. The network device 101 may request a new SSID and a password from the authentication and control server 103 and upon receiving the new SSID and the password, the network device 101 may reboot or restart and then connect to the access point 102 using the new SSID. The user equipment 104, by means of the application, may update the setting of the network device 101.

Figure 2:
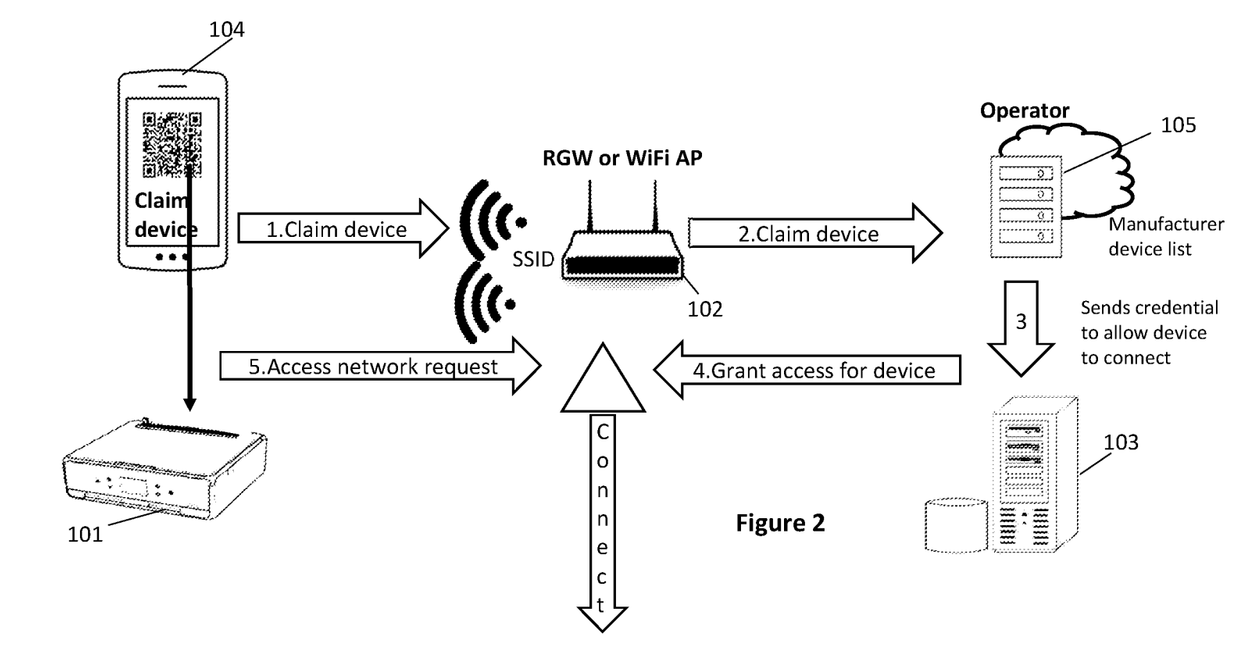
FIG. 2 illustrates another diagram involving a network device, an access point (AP) or Residential Gateway (RGW), a server, and an operator's network, according to an exemplary embodiment herein.

Referring to FIG. 2, there is illustrated another diagram involving the apparatuses shown in FIG. 1, for facilitating connection to a WiFi network according to an exemplar embodiment. Assume that a user bought a network device 101 such as a printer provided with an LCD screen. The user by means of a user equipment 104 may claim the network device 101. The network device 101 detects an access point or (operator) RGW 102 provided with a service set identifier (SSID) and then connects to the RGW 102 using the SSID and performs an authentication process towards an authentication and control server 103 for verifying a unique certificate of the network device 101, which is paired with a corresponding certificate in said server 103. The server 103 may be connected to an operator network 105 or to a server 105 of the operator network which includes a manufacturer list. As an example, a manufacturer (MF) of the network device 101. The server 105 may send credentials to allow the device 101 to connect. As previously described, in case the authentication process is successful, the network device 101 generates a unique identification information (e.g., a QR code as shown) for enabling the user equipment 104 to scan said unique identification information. It should be mentioned that server 105 and server 103 may be integrated devices or separate devices. FIG. 2 shows the exemplary scenario where the servers 103 and 105 are separate entities, which is not necessarily the case. Additional details performed by the different apparatuses have already been described and need not be repeated.

Figure 3:
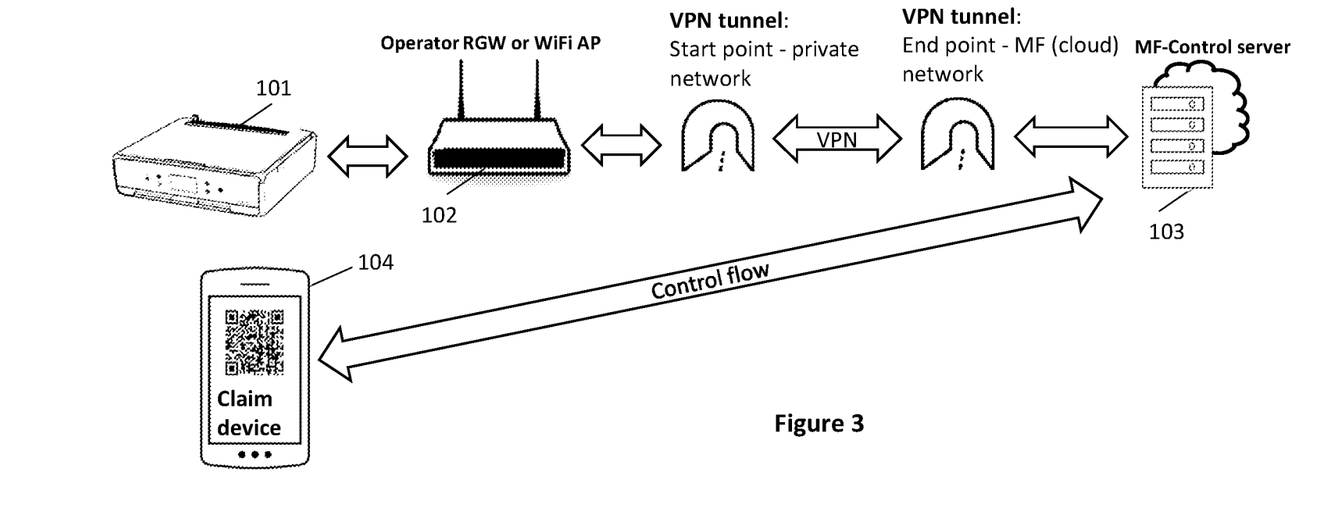
FIG. 3 illustrates another diagram involving the apparatuses of FIG. 2 for connection to a secure private network.

Referring to FIG. 3 there is illustrated another diagram involving the apparatuses of FIG. 2 for facilitating connection to a WiFi network. However, in this scenario, the network device 101 connects to the network using a secure private network. The path is secure all the way from the network device 101 itself (using e.g., WiFi isolation) and tunneled all the way to the manufacture's network. WiFi isolation of an AP means a feature in the WiFi AP 102 that allows a user to lock down the WiFi network. This feature also allows and restricts clients connected to the WiFi network. The tunnelling and protection of the WiFi network is advantageous since it makes it hard for anyone to tamper with the device(s), which may be the case in today's unsure home networks where devices may be modified by malware and hackers. Hence, to avoid these issues, the connection between the network device 101 and the server of the network operator or of the manufacturer is protected using a virtual private network (VPN) tunnel. This way the flow is controlled between the user equipment 104 and the server of the operator or of the manufacturer 103. The start point of the VPN tunnel starts in the private network of the user, and at the end point of the VPN tunnels ends in the operator or MF (cloud) network. As mentioned earlier, the path is secured all the way from the network device 101 and tunneled all the way to the operator or MF network server 103.

Figure 4:
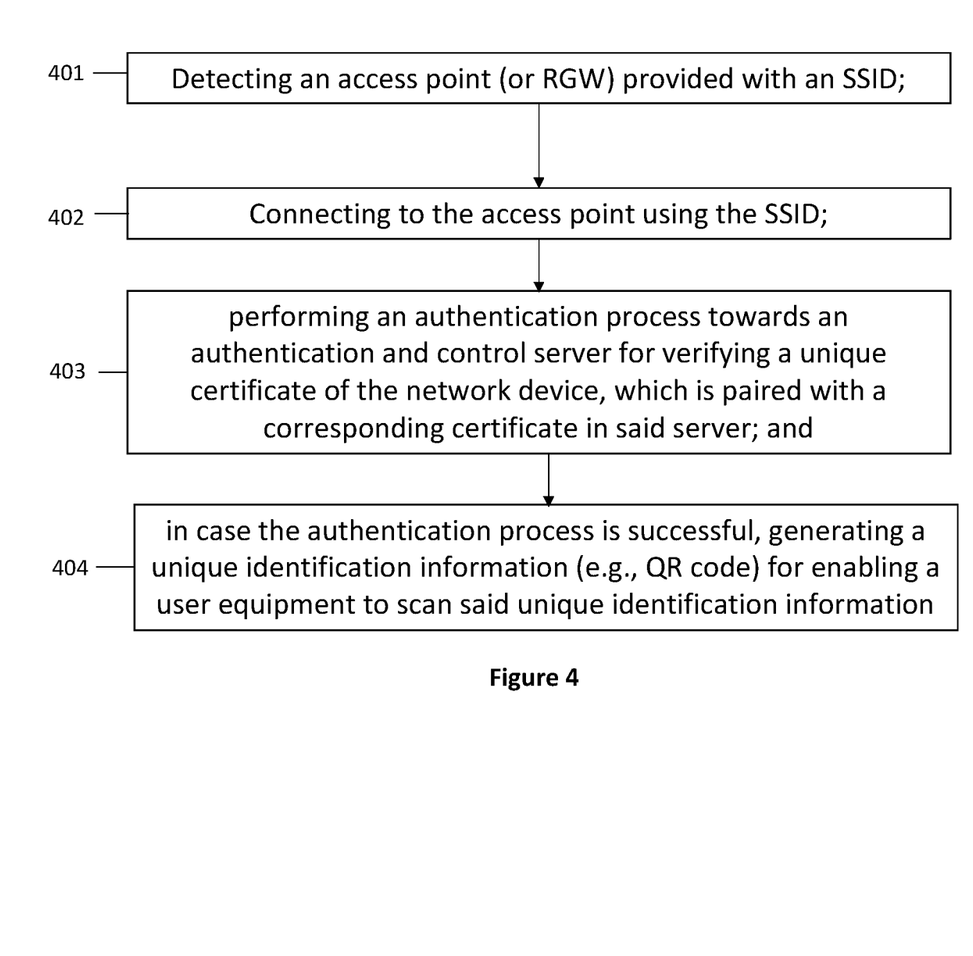
FIG. 4 illustrates a flowchart of a method performed by a network device according to an exemplary embodiment herein.

Referring to FIG. 4, there is illustrated a flowchart of a method performed by a network device 101 according to an exemplary embodiment as previously described. The method comprises:
- (401) detecting an access point (or RGW) provided with an SSID;
- (402) connecting to said access point using said SSID;
- (403) performing an authentication process towards an authentication and control server for verifying a unique certificate of the network device, which is paired with a corresponding certificate in said server; and
- (404) in case the authentication process is successful, generating a unique identification information (e.g., QR code or barcode) for enabling a user of a user equipment to scan said unique identification information.

Details about how authentication is performed have already been described. According to an embodiment, the SSID is a reserved SSID for enabling the network device to connect to the access point.

According to another embodiment, the method further comprises, requesting, by the network device, a new SSID and a password from the authentication and control server; and upon receiving the new SSID and the password, rebooting and connecting to the access point using the new SSID. The unique certificate of the device may be registered in a server of the network operator.

Figure 5:
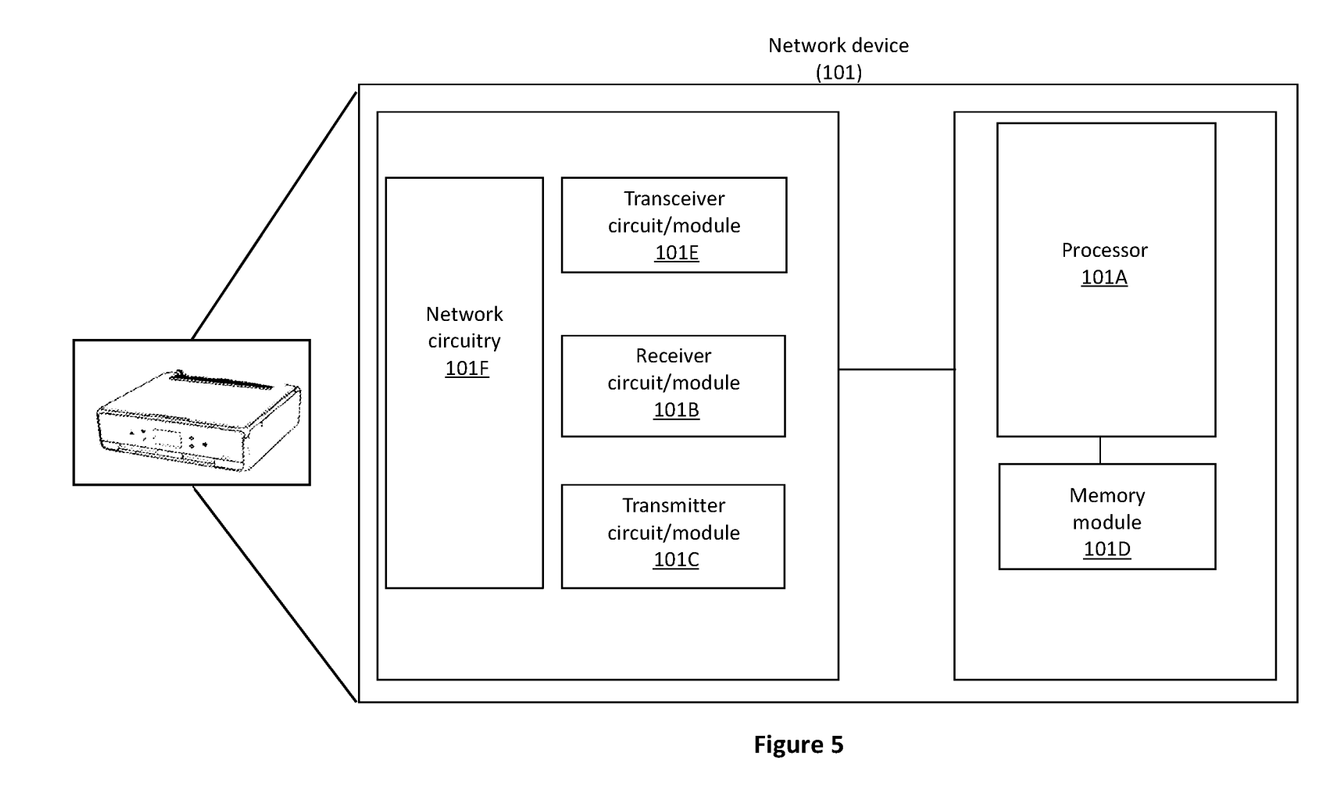
FIG. 5 is a block diagram depicting a network device according to embodiments herein.

To perform the method or procedure steps/actions described above, a network device 101 is provided as depicted in FIG. 5.

The network device 101 comprises a processing circuit or a processing module or a processor or means 101A, network circuitry 101F for enabling WiFi connectivity; a receiver circuit or receiver module 101B; a transmitter circuit or transmitter module 101C; a memory module 101D and a transceiver circuit or transceiver module 101E which may include the transmitter circuit 101C and the receiver circuit 101B. The network device 101 may also be provided with a screen or display (e.g., LCD) (not shown) as previously mentioned.

The network device 101 may be a printer, a TV, a scanner, a fax machine, etc., just to mention some examples.

The processing module/circuit 101A includes a processor, microprocessor, an application specific integrated circuit (ASIC), field programmable gate array (FPGA), or the like, and may be referred to as the "processor 101A." The processor 101A controls the operation of the network device 101 and its components. Memory (circuit or module) 101D includes a random access memory (RAM), a read only memory (ROM), and/or another type of memory to store data and instructions that may be used by processor 101A. In general, it will be understood that the network device 101 in one or more embodiments includes fixed or programmed circuitry that is configured to carry out the operations in any of the embodiments disclosed herein.

In at least one such example, the network device 101 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the network device 101 operations disclosed herein. Further, it will be appreciated that the network device 101 may comprise additional components not shown in FIG. 5.

As previously described, the network device 101 is configured to detect an access point provided with an SSID; connect to said access point using said SSID; perform an authentication process towards an authentication and control server for verifying a unique certificate of the device, which is paired with a corresponding certificate in said server; and in case the authentication process is successful, generate a unique identification information for enabling a user equipment to scan said unique identification information. The network device 101 may further be configured to request a new SSID and a password from the authentication and control server; and upon receiving the new SSID and the password, to reboot and connect to the access point using the new SSID.

There is also provided a computer program comprising instructions which when executed on at least one processor of the network device 101 according to embodiments herein, cause the at least one processor to carry out the method describe above. Also, a carrier signal containing the computer program is provided, wherein the carrier signal is one of a computer readable storage medium; an electronic signal, optical signal, or a radio signal.

Figure 6:
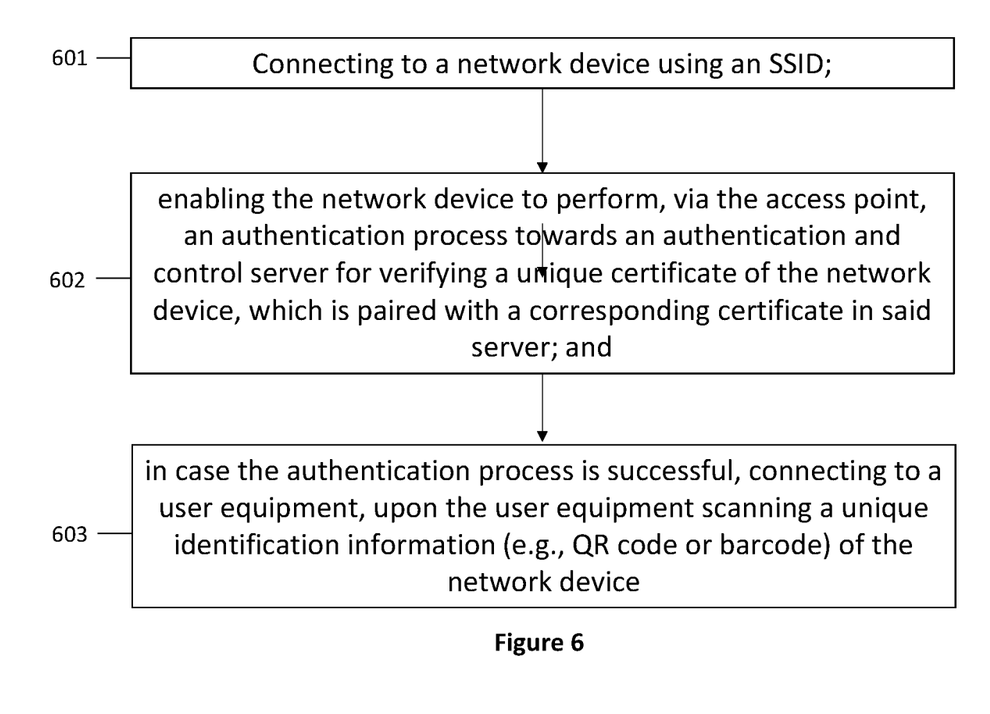
FIG. 6 illustrates a flowchart of a method performed by an access point (or RGW) according to an exemplary embodiment herein.

Referring to FIG. 6 there is illustrated a flowchart of a method performed by an access point 102 or a RGW according to an exemplary embodiment as previously described. The method comprises:
- (601) connecting to a network device 101 using a service set identifier (SSID) of the access point;
- (602) enabling the network device 101 to perform, via the access point 102, an authentication process towards an authentication and control server for verifying a unique certificate of the network device 101, which is paired with a corresponding certificate in said server; and
- (603) in case the authentication process is successful, connecting to a user equipment, upon the user equipment scanning a unique identification information (e.g., QR code or barcode) of the network device 101.

According to an embodiment, the method further comprises, receiving from the network device 101, a request requesting a new SSID and a password from the authentication and control server; and upon receiving the new SSID and the password, and forwarding it to the network device 101, rebooting and connecting to the network device 101 using the new SSID. Additional actions performed by the access point have already been described.

Figure 7:
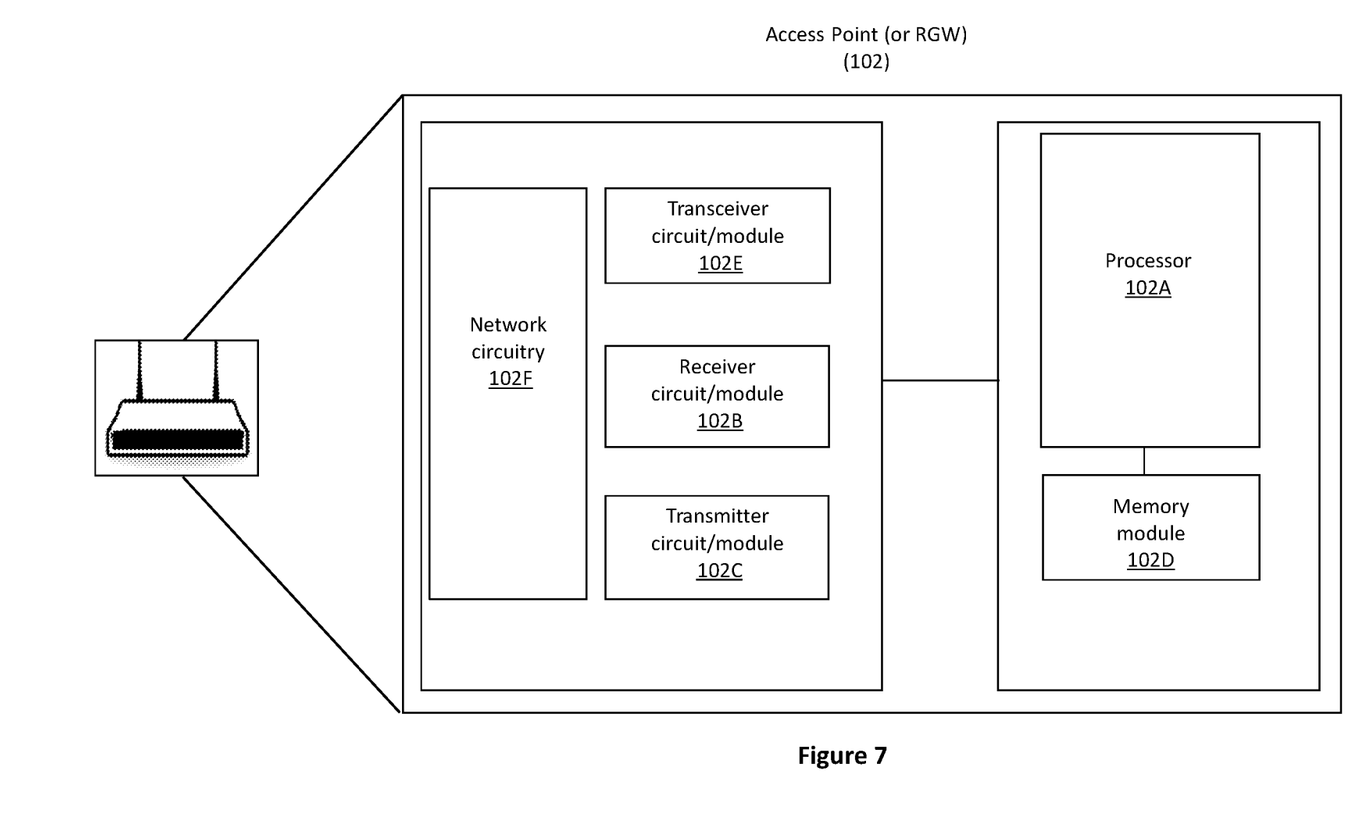
FIG. 7 is a block diagram depicting an access point (or RGW) according to embodiments herein.

To perform the method or procedure steps/actions described above, an access point (or RGW) 102 is provided as depicted in FIG. 7.

The access point 102 comprises a processing circuit or a processing module or a processor or means 102A, network circuitry 102F for enabling WiFi connectivity; a receiver circuit or receiver module 102B; a transmitter circuit or transmitter module 102C; a memory module 102D and a transceiver circuit or transceiver module 102E which may include the transmitter circuit 102C and the receiver circuit 102B. The access point 102 generally provided with an antenna circuitry integrated or external for enabling communication with other devices.

The processing module/circuit 102A includes a processor, microprocessor, an application specific integrated circuit (ASIC), field programmable gate array (FPGA), or the like, and may be referred to as the "processor 102A." The processor 101A controls the operation of the access point 102 and its components. Memory (circuit or module) 102D includes a random access memory (RAM), a read only memory (ROM), and/or another type of memory to store data and instructions that may be used by processor 102A. In general, it will be understood that the access point 102 in one or more embodiments includes fixed or programmed circuitry that is configured to carry out the operations in any of the embodiments disclosed herein.

In at least one such example, the access point 102 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the access point operations disclosed herein. Further, it will be appreciated that the access point 102 may comprise additional components not shown in FIG. 7.

The access point 102 is configured to: connect to a network device 101 using a service set identifier (SSID) of the access point 102; enable the network device 101 to perform, via the access point 102, an authentication process towards an authentication and control server for verifying a unique certificate of the network device, which is paired with a corresponding certificate in said server; and in case the authentication process is successful, to connect to a user equipment, upon the user equipment scanning a unique identification information of the network device.

As previously described, the access point 102 is configured to receive from the network device 101, a request requesting a new SSID and a password from the authentication and control server; and upon receiving the new SSID and the password, and forwarding to the network device 101, to reboot and to connect to the network device using the new SSID. Additional actions performed by the access point 101 have already been described and need not be repeated again.

There is also provided a computer program comprising instructions which when executed on at least one processor of the access point 102 according to embodiments herein, cause the at least one processor to carry out the method describe above. Also, a carrier signal containing the computer program is provided, wherein the carrier signal is one of a computer readable storage medium; an electronic signal, optical signal, or a radio signal.

An advantage with embodiments herein is to facilitate connection to a WiFi network by means of the network device and the access point, respectively. This allows network devices to connect to the access point as soon as they are turned on. An identification information such as a QR code or a barcode is generated on a screen of the network device for a user to scan (by means of a user equipment such as a smart phone) to claim the network device and to access to the WiFi access network.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. In particular, it should be noted that although terminology from WiFi has been used in this disclosure to exemplify the invention, this should not be seen as limiting the scope of the invention to only the aforementioned system. Other wireless systems, including LTE-A (or LTE-Advanced), 5G, Universal Mobile Telecommunications Service (UMTS) and WiMax may also benefit from exploiting the ideas covered within this disclosure.

The invention claimed is:

1. A method performed by a network device, the method comprising:
    detecting an access point provided with a service set identifier (SSID);
    connecting to said access point using said SSID;
    performing an authentication process towards an authentication and control server for verifying a unique certificate of the network device, which is paired with a corresponding certificate in said server; and
    in case the authentication process is successful, generating a unique identification information for enabling a user equipment to scan said unique identification information;
    wherein the method further comprises:
        requesting a new SSID and a password from the authentication and control server; and
        upon receiving the new SSID and the password, rebooting and connecting to the access point using the new SSID.

2. The method according to claim 1, wherein the SSID is a reserved SSID for enabling the network device to connect to the access point.

3. The method according to claim 1, wherein the unique certificate of the network device is registered in a server of a network operator.

4. The method according to claim 1, wherein the connection between the network device and a server of a network operator is protected using a virtual private network (VPN).

5. A network device comprising a processor and a memory containing instructions executable by processor wherein the network device is configured to:
    detect an access point provided with a service set identifier (SSID);
    connect to said access point using said SSID;
    perform an authentication process towards an authentication and control server for verifying a unique certificate of the device, which is paired with a corresponding certificate in said server;
    in case the authentication process is successful, generate a unique identification information for enabling a user equipment to scan said unique identification information;
    wherein the network device is further configured to:
        request a new SSID and a password from the authentication and control server; and
        upon receiving the new SSID and the password, reboot and connect to the access point using the new SSID.

6. The network device according to claim 5, wherein the SSID is a reserved SSID for enabling the network device to connect to the access point.

7. The network device according to claim 5, wherein the unique certificate of the device is registered in a server of a network operator.

8. The network device according to claim 5, wherein the connection between the network device and a server of a network operator is protected using a virtual private network (VPN).

9. A method performed by an access point, the method comprising:
- connecting to a network device using a service set identifier (SSID) of the access point;
- enabling the network device to perform, via the access point, an authentication process towards an authentication and control server for verifying a unique certificate of the network device, which is paired with a corresponding certificate in said server; and
- in case the authentication process is successful, connecting to a user equipment, upon the user equipment scanning a unique identification information of the network device;
- wherein the method further comprises:
  - receiving, from the network device, a request requesting a new SSID and a password from the authentication and control server; and
  - upon receiving the new SSID and the password and forwarding the new SSID and the password to the network device, rebooting and connecting to the network device using the new SSID.

10. The method according to claim 9, wherein the SSID is a reserved SSID for enabling the access point to connect to the network device.

11. The method according to claim 9, wherein the connection between the access point, the network device and a server of a network operator is protected using a virtual private network (VPN).

12. An access point comprising a processor and a memory containing instructions executable by said processor wherein the access point is configured to:
- connect to a network device using a service set identifier (SSID) of the access point;
- enable the network device to perform, via the access point, an authentication process towards an authentication and control server for verifying a unique certificate of the network device, which is paired with a corresponding certificate in said server; and
- in case the authentication process is successful, connect to a user equipment, upon the user equipment scanning a unique identification information of the network device;
- wherein the access point is further configured to:
  - receive, from the network device, a request requesting a new SSID and a password from the authentication and control server; and
  - upon receiving the new SSID and the password and forwarding the new SSID and the password to the network device, reboot and connect to the network device using the new SSID.

13. The access point according to claim 12, wherein the SSID is a reserved SSID for enabling the access point to connect to the network device.

14. The access point according to claim 12, wherein the connection between the access point, the network device and a server of a network operator is protected using a virtual private network (VPN).

* * * * *

UNITED STATES PATENT AND TRADEMARK OFFICE
CERTIFICATE OF CORRECTION

| | | |
|---|---|---|
| PATENT NO. | : 12,267,677 B2 | |
| APPLICATION NO. | : 17/840244 | |
| DATED | : April 1, 2025 | |
| INVENTOR(S) | : Magnus Bergmark and Michael Huber | |

It is certified that error appears in the above-identified patent and that said Letters Patent is hereby corrected as shown below:

In the Specification

In Column 2, Line 38, should read "according to any one of pending claims 1-4. Also, a carrier"

In Column 2, Line 47, should read "to any one of pending claims 9-11. Also, a carrier signal"

Signed and Sealed this
Seventeenth Day of June, 2025

Coke Morgan Stewart
*Acting Director of the United States Patent and Trademark Office*